United States Patent
Joshi et al.

(10) Patent No.: US 10,293,716 B2
(45) Date of Patent: May 21, 2019

(54) STOWABLE VEHICLE SEAT ASSEMBLY HAVING A PIVOT LINK

(71) Applicant: Lear Corporation, Southfield, MI (US)

(72) Inventors: Abhijit Joshi, Bhosari (IN); Brian D. Phillips, Almont, MI (US); Eric Beaulieu, Farmington Hills, MI (US); Gegi George, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 6 days.

(21) Appl. No.: 15/586,365

(22) Filed: May 4, 2017

(65) Prior Publication Data
US 2018/0319293 A1   Nov. 8, 2018

(51) Int. Cl.
*B60N 2/30* (2006.01)

(52) U.S. Cl.
CPC ............ *B60N 2/3011* (2013.01); *B60N 2/309* (2013.01); *B60N 2/3065* (2013.01)

(58) Field of Classification Search
CPC .... B60N 2/3011; B60N 2/3065; B60N 2/309; B60N 2/3063; B60N 2/3031; B60N 2/3029; B60N 2/3034; B60N 2/3068; B60N 2/3072; B60N 2/3075
USPC ................................................ 297/340–341
See application file for complete search history.

(56) References Cited

U.S. PATENT DOCUMENTS

| | | | |
|---|---|---|---|
| 4,805,953 A | 2/1989 | Yamauchi | |
| 5,765,894 A * | 6/1998 | Okazaki | B60N 2/01583 296/65.03 |
| 5,941,602 A | 8/1999 | Sturt et al. | |
| 6,000,742 A * | 12/1999 | Schaefer | B60N 2/3011 296/65.09 |
| 6,012,755 A | 1/2000 | Hecht et al. | |
| 6,578,919 B2 | 6/2003 | Seibold et al. | |
| 6,601,900 B1 * | 8/2003 | Seibold | B60N 2/0292 296/65.05 |
| 6,736,459 B1 | 5/2004 | Sturt | |
| 6,908,155 B1 | 6/2005 | Wieclawski | |
| 7,255,399 B2 | 8/2007 | White et al. | |
| 7,267,406 B2 | 9/2007 | Sturt | |
| 7,328,929 B2 | 2/2008 | Epaud | |
| 9,499,840 B2 | 11/2016 | Szybisty et al. | |
| 2002/0130542 A1 * | 9/2002 | Ellerich | B60N 2/01583 297/331 |
| 2003/0001419 A1 * | 1/2003 | Roth | B60N 2/01583 297/378.1 |
| 2004/0061371 A1 * | 4/2004 | Tame | B60N 2/206 297/378.12 |

(Continued)

FOREIGN PATENT DOCUMENTS

| | | |
|---|---|---|
| DE | 102006002520 A1 | 7/2006 |
| EP | 2064089 B1 | 6/2010 |
| GB | 345908 A | 4/1931 |

OTHER PUBLICATIONS

German Patent Office, Office Action for corresponding German Application No. 102018202017.5, dated Feb. 7, 2019.

*Primary Examiner* — Kyle J. Walraed-Sullivan
(74) *Attorney, Agent, or Firm* — Brooks Kushman P.C.

(57) ABSTRACT

A stowable seat assembly having a seat back and a seat bottom. The seat bottom has a seat bottom frame that includes a drive link that is pivotally connected to a front link and the seat back. A pivot link is pivotally connected to the drive link and a side member of the seat bottom frame.

17 Claims, 6 Drawing Sheets

(56) References Cited

U.S. PATENT DOCUMENTS

| | | | |
|---|---|---|---|
| 2004/0084946 A1* | 5/2004 | Bonk | B60N 2/01583 297/378.14 |
| 2004/0124684 A1* | 7/2004 | Bonk | B60N 2/01583 297/378.12 |
| 2006/0033373 A1* | 2/2006 | Kammerer | B60N 2/0292 297/378.1 |
| 2006/0138839 A1* | 6/2006 | Ryan | B60N 2/01583 297/340 |
| 2006/0152058 A1* | 7/2006 | Pejathaya, Sr. | B60N 2/0232 297/378.12 |
| 2010/0052389 A1* | 3/2010 | Holdampf | B60N 2/22 297/316 |
| 2010/0052391 A1* | 3/2010 | Hurst, III | B60N 2/3031 297/341 |
| 2010/0244524 A1* | 9/2010 | Kumazaki | B60N 2/12 297/341 |
| 2014/0001809 A1* | 1/2014 | Line | B60N 2/2356 297/378.1 |
| 2014/0167466 A1* | 6/2014 | Line | B60N 2/3065 297/340 |
| 2016/0304010 A1* | 10/2016 | Ecker | B60N 2/933 |
| 2017/0001543 A1* | 1/2017 | Dlugokecki | B60N 2/10 |
| 2017/0001546 A1 | 1/2017 | Keyser et al. | |
| 2017/0080831 A1* | 3/2017 | Kaemmerer | B60N 2/0224 |

\* cited by examiner

STOWABLE VEHICLE SEAT ASSEMBLY HAVING A PIVOT LINK

TECHNICAL FIELD

This disclosure relates to a stowable vehicle seat assembly that may have a pivot link.

BACKGROUND

A stowable vehicle seat is disclosed in U.S. Patent Publication No. 2017/0001543.

SUMMARY

In at least one embodiment, a seat assembly is provided. The seat assembly may have a seat bottom and a seat back. The seat back may be pivotally disposed on the seat bottom. The seat bottom may have a seat bottom frame. The seat bottom frame may include a side member, a front link, a drive link, and a pivot link. The side member may have a first side member end and a second side member end. The front link may have a first front link end that may be pivotally connected to a support member. The front link may also be pivotally connected to the first side member end. The drive link may have a first drive link end that may be pivotally connected to the front link and a second drive link end that may be pivotally connected to the seat back. The pivot link may have a first pivot link end that may be pivotally connected to the drive link and a second pivot link end that may be pivotally connected to the second side member end.

In at least one embodiment, a seat assembly is provided. The seat assembly may include a seat back and a seat bottom. The sea bottom may have a seat bottom frame. The seat bottom frame may include a first mounting bracket, a second mounting bracket, a front link, a side member, a drive link, and a pivot link. The first mounting bracket and the second mounting bracket may be fixedly mountable to a support member. The seat back may be pivotable about a seat back pivot axis with respect to the second mounting bracket. The front link may be pivotable about a first front link axis with respect to the first mounting bracket. The side member may be pivotable about a second front link axis with respect to the front link. The drive link may be pivotable about a first drive link axis with respect to the front link. The drive link may also be pivotable about a second drive link axis with respect to the seat back. The pivot link may be pivotable about a first pivot link axis with respect to the drive link. The pivot link may also be pivotable about a second pivot link axis with respect to the side member.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
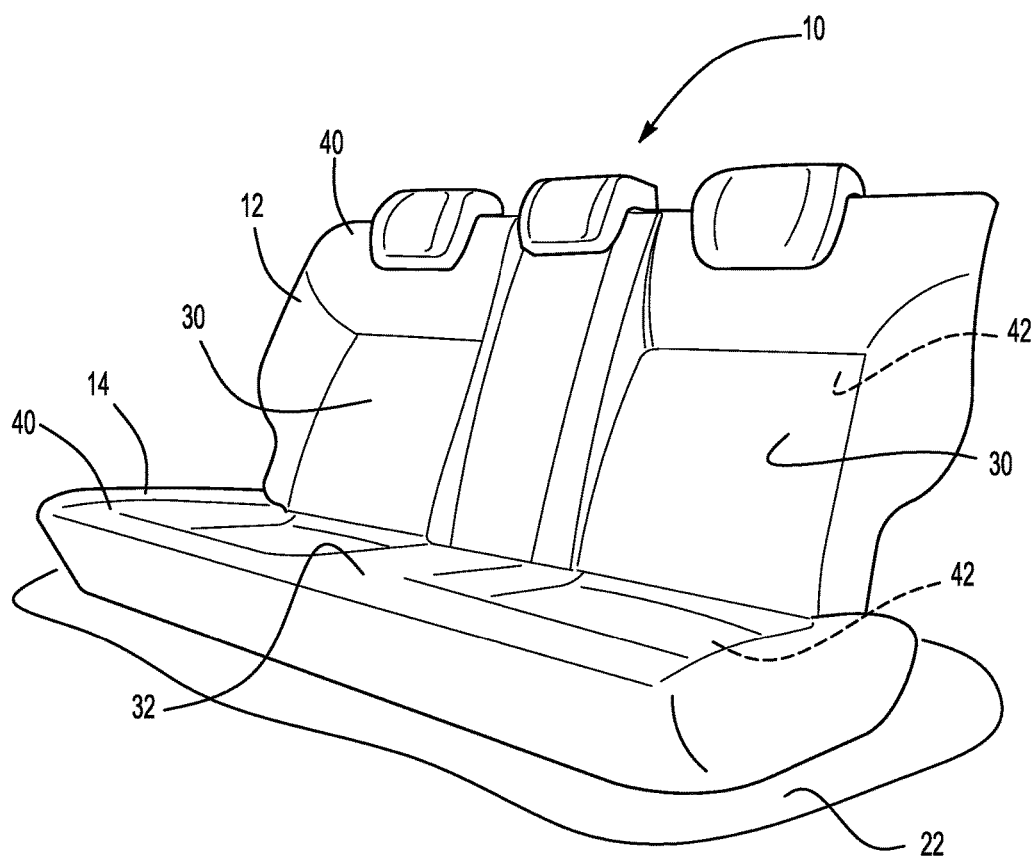
FIG. 1 is a perspective view of an example of a seat assembly.

Referring to FIG. 1, an example of a seat assembly 10 is shown. The seat assembly 10 may be provided with or configured for use with a vehicle, such as a motor vehicle like a car or truck. In at least one configuration, the seat assembly 10 may be configured as a rear seat that may be positioned behind a front seating row or front seat that may be occupied by a vehicle driver. The seat assembly 10 may include a seat back 12 and a seat bottom 14.

Figure 2:
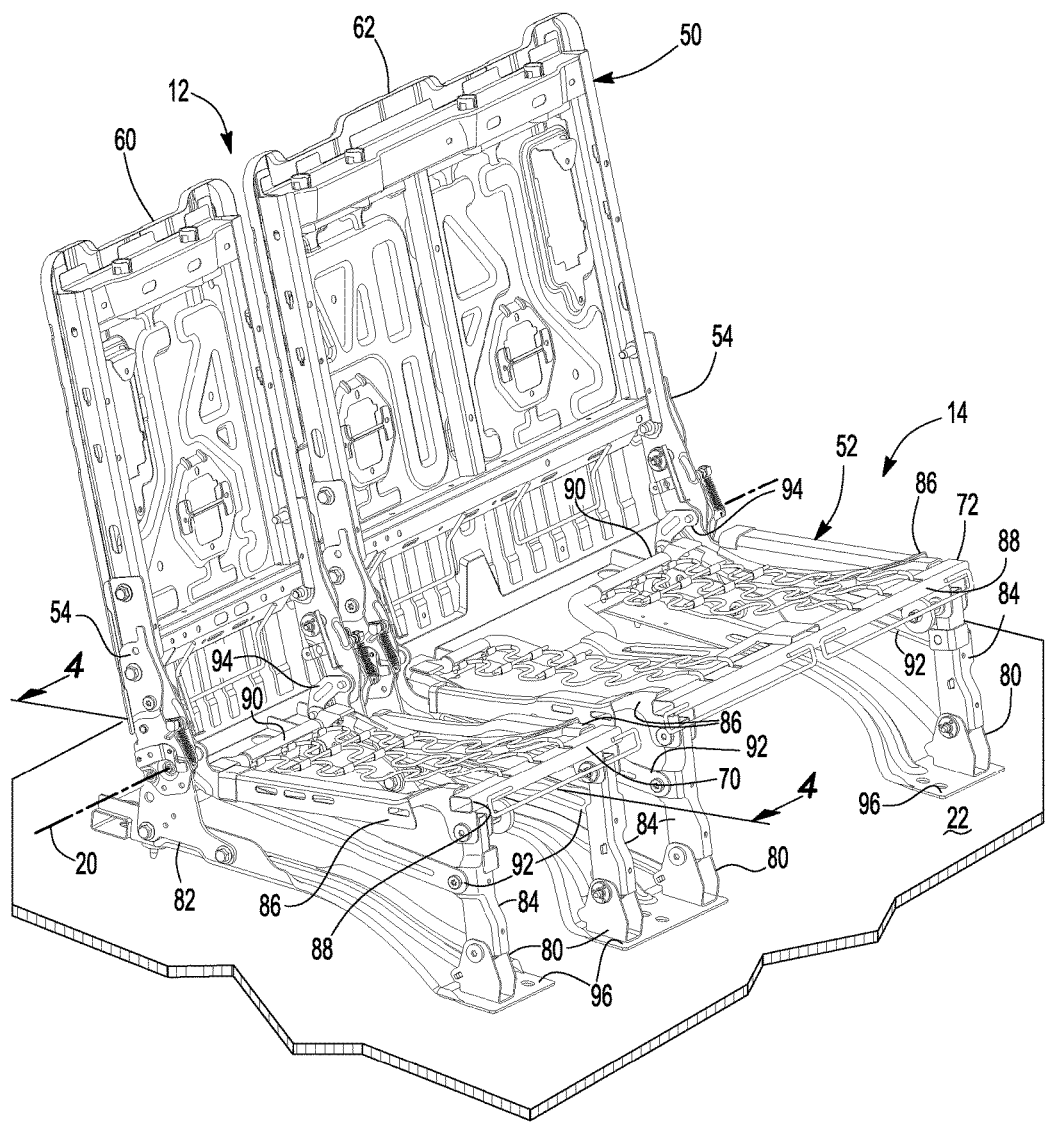
FIG. 2 is a perspective view showing the seat assembly with the trim covers and cushions removed.

Referring to FIGS. 1 and 2, the seat back 12 may be configured to support the back of a seat occupant. The seat back 12 may be disposed proximate the seat bottom 14. For example, the seat back 12 may be disposed above the seat bottom 14 and may be pivotally disposed on the seat bottom 14. For example, the seat back 12 may be pivotable about a seat back pivot axis 20 with respect to the seat bottom 14.

The seat bottom 14 may be disposed adjacent to the seat back 12. Like the seat back 12, the seat bottom 14 may also be configured to support a seat occupant. The seat bottom 14 may be configured to be mounted on a support member 22, such as a vehicle body structure like a floor pan of a vehicle.

Referring to FIG. 1, the seat back 12 and the seat bottom 14 may cooperate to provide one or more seating positions. For instance, the seat back 12 and seat bottom 14 may cooperate to define one or more primary seating positions 30 and optionally a secondary seating position 32. The secondary seating position 32 may be disposed between two primary seating positions 30 and may be located near or at the center of the seat assembly 10. A foldable armrest may be provided in the seat back 12 at the secondary seating position 32 in one or more embodiments. The seat back 12 and seat bottom 14 may each have a trim cover 40 and one or more cushions 42.

One or more trim covers 40 may form an exterior surface of at least a portion of the seat back 12 and the seat bottom 14. The trim cover 40 may be disposed on cushion 42. For example, one trim cover 40 may engage and may at least partially cover or conceal the cushion 42 of the seat back 12 and another trim cover 40 may engage and may at least partially cover or conceal the cushion 42 of the seat bottom 14. The trim cover 40 may face toward and may support a seat occupant. The trim cover 40 may be made of any suitable material, such as fabric, vinyl, leather, or combinations thereof. The trim cover 40 may be secured to the seat back 12 and seat bottom 14 in any suitable manner. For example, the trim cover 40 may be secured with one or more attachment features, such as a hook, clip, ring, hook and loop fastener, drawstring or the like.

One or more cushions 42 may be configured to help support a seat occupant. A cushion 42 may be disposed on a support structure or frame of the seat assembly 10 and may be made of any suitable material or materials, such as a molded polymeric material such as open cell foam or closed cell foam.

Referring to FIG. 2, the seat assembly 10 is shown without the trim covers 40 and cushions 42 to more clearly illustrate internal components of the seat assembly 10, such as a seat back frame 50, a seat bottom frame 52, and one or more latch mechanisms 54.

Figure 7:
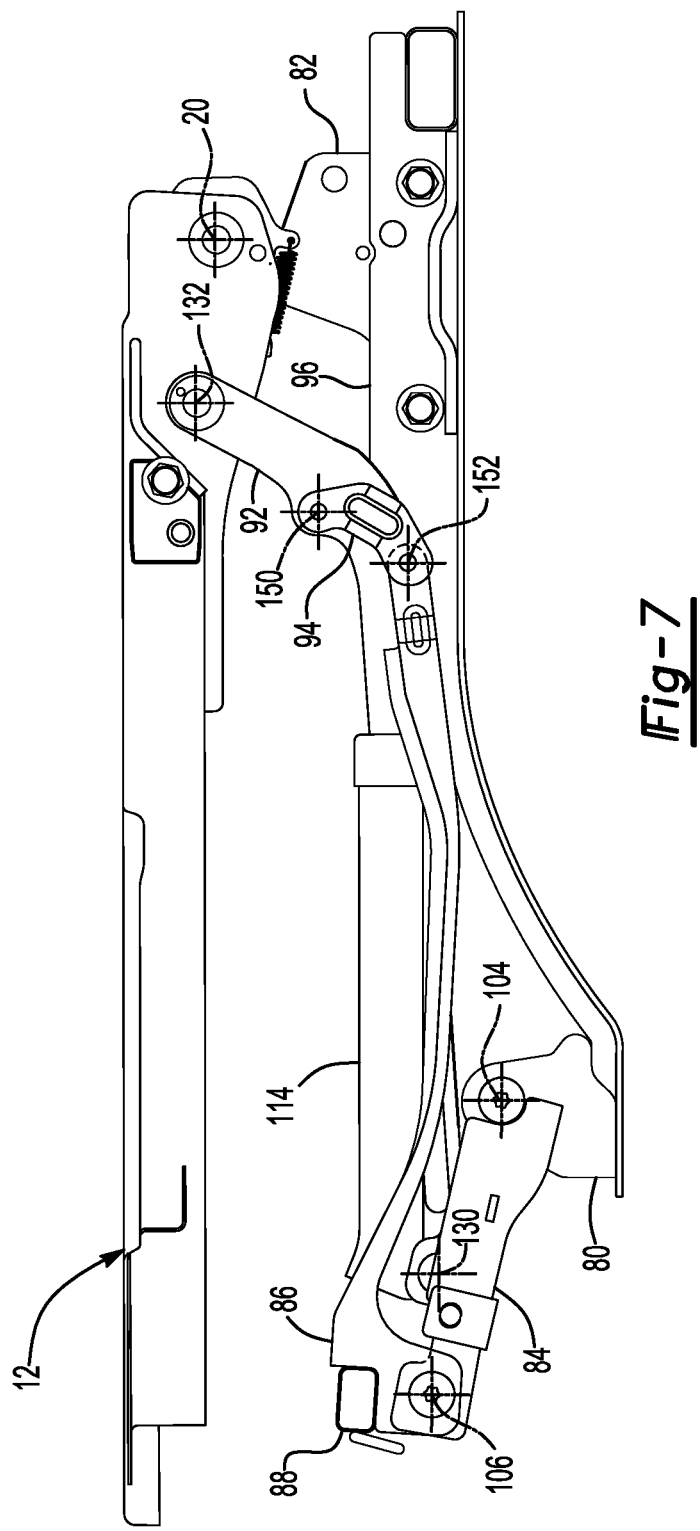
FIG. 7 is a side view of the seat assembly in a stow position.

The seat back frame 50 may be a structural frame of the seat back 12. In at least one configuration, the seat back frame 50 may have multiple seat back portions that may be configured to pivot or rotate about the seat back pivot axis 20 between a generally upright or generally vertical use position shown in FIGS. 2 and 3 and a generally horizontal stow position atop the seat bottom 14 as shown in FIG. 7. The seat assembly 10 may receive a seat occupant when the seat back 12 is in the use position. At least a portion of the seat back 12 and seat back frame 50 may be folded over the seat bottom 14 and may engage the seat bottom 14 when the seat back 12 is in the stow position. In FIG. 2, the seat back frame 50 has a 40/60 split configuration that may include a first seat back portion 60 and a second seat back portion 62 that may pivot independently about the seat back pivot axis 20. It is also contemplated that the seat assembly 10 may be provided with other configurations, such as a 40/20/40 split configuration or without splits.

The seat bottom frame 52 may be mounted to the support member 22. At least a portion of the seat bottom frame 52 may be movable with respect to the support member 22 when the seat back 12 is moved between the use position and the stow position as will be discussed in more detail below.

The seat bottom frame 52 may be a structural frame of the seat bottom 14. In at least one configuration, the seat bottom frame 52 may have multiple seat bottom portions that may be configured to pivot or rotate about multiple axes when the seat back 12 is moved between the use position and the stow position. In FIG. 2, the seat bottom frame 52 has a 40/60 split configuration that may include a first seat bottom portion 70 and a second seat bottom portion 72 that may move independently with respect to the first seat bottom portion 70. It is also contemplated that the seat assembly 10 may be provided with other configurations, such as a 40/20/40 split configuration or without splits.

The seat bottom frame 52 will primarily be described in the context of a single seat bottom portion, such as the first seat bottom portion 70. It is to be understood that the second seat bottom portion 72 may be provided with similar or identical components and may function or move in a similar manner as the first seat bottom portion 70. In at least one configuration, the seat bottom frame 52 may include at least one first mounting bracket 80, at least one second mounting bracket 82, at least one front link 84, at least one side member 86, a front member 88, a rear member 90, at least one drive link 92, and at least one pivot link 94.

Figure 3:
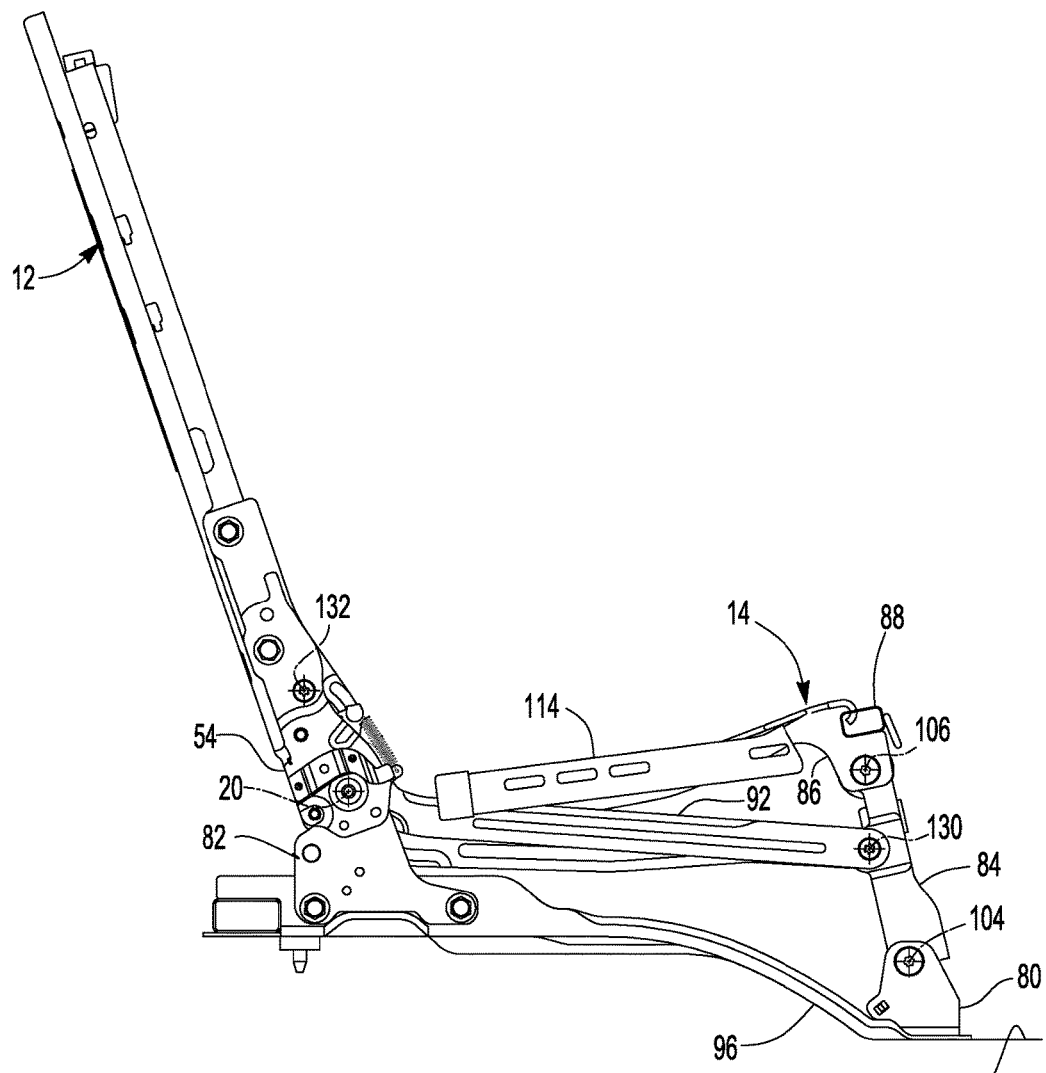
FIG. 3 is a side view of the seat assembly of FIG. 2 in a use position.
Figure 4:
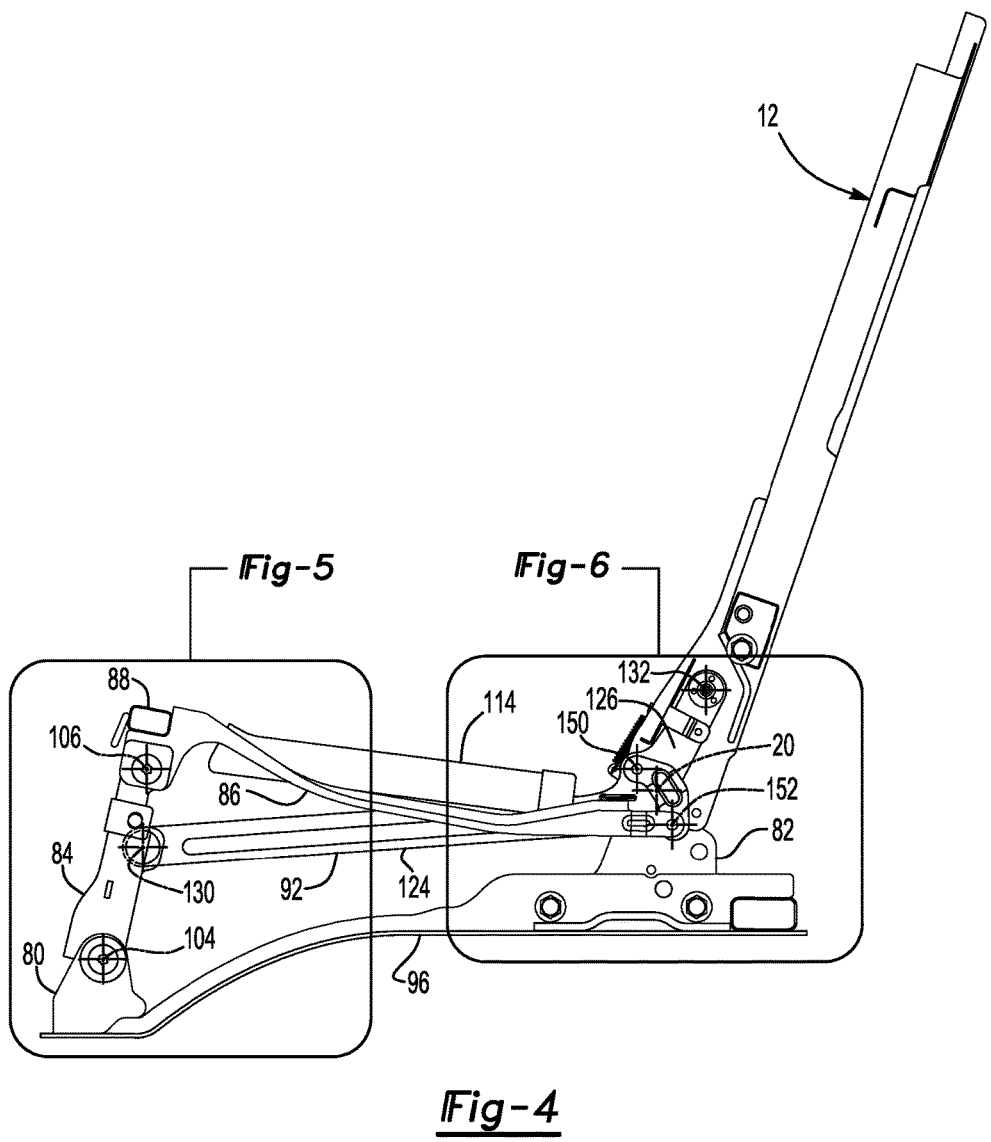
FIG. 4 is a section view of the seat assembly of FIG. 2 along section line 4-4.

Referring to FIGS. 2-4, at least one first mounting bracket 80 may be fixedly positioned with respect to the support member 22 or may be fixedly mountable to the support member 22. In the configuration shown, two first mounting brackets 80 are provided with each seat bottom portion. The first mounting brackets 80 may be disposed at or near the front of the seat assembly 10 and may be spaced apart from each other. The first mounting brackets 80 may be directly mounted on the support member 22 or may be mounted on an intervening bracket 96 that may be mounted to the support member 22. In the configuration shown, a plurality of brackets 96 are provided to which at least one first mounting bracket 80 and at least one second mounting bracket 82 may be coupled.

At least one second mounting bracket 82 may be fixedly positioned with respect to the support member 22 or may be fixedly mountable to the support member 22. In the configuration shown, two second mounting brackets 82 are provided with each seat bottom portion. The second mounting brackets 82 may be disposed at or near the rear of the seat assembly 10 and may be spaced apart from each other. The second mounting brackets 82 may be directly mounted on the support member 22 or may be mounted on an intervening bracket 96 that may be mounted to the support member 22. The seat back frame 50 of the seat back 12 may be pivotally connected to the second mounting brackets 82 and may be pivotable about the seat back pivot axis 20 with respect to the second mounting brackets 82. The seat back frame may be pivotally connected in any suitable manner. For example, a pivot pin may pivotally couple the seat back frame 50 to a second mounting bracket 82. As such, the seat back pivot axis 20 may extend through the second mounting bracket 82.

At least one front link 84 may be pivotally coupled to a corresponding first mounting bracket 80. In the configuration shown, two front links 84 are provided with each seat bottom portion. The front links 84 may be disposed at or near the front of the seat bottom 14 and may be spaced apart from each other. As is best shown with reference to FIG. 5, each front link 84 may have a first front link end 100 and a second front link end 102.

The first front link end 100 may be pivotally connected to the support member 22 via a first mounting bracket 80. For example, each front link 84 may be pivotable about a first front link axis 104 with respect to a first mounting bracket 80. The first front link axis 104 may be disposed substantially parallel to the seat back pivot axis 20. The first front link axis 104 may extend through the first front link end 100. The first front link end 100 may be pivotally coupled to the first mounting bracket 80 in any suitable manner, such as with a pivot pin. A biasing member, such as a spring, may be disposed inside the front link 84 and may receive the pivot pin. The biasing member may engage the first mounting bracket 80 and the front link 84 and may exert a biasing force that may help bias the front link 84 to rotate about the first front link axis 104 to help bias the seat assembly 10 toward the stow position.

The second front link end 102 may be disposed opposite the first front link end 100. The second front link end 102 may be pivotally connected to a side member 86. For example, each front link 84 may be pivotable about a second front link axis 106 with respect to a side member 86. The second front link axis 106 may be disposed substantially parallel to the seat back pivot axis 20. In addition, the second front link axis 106 may extend through the second front link end 102. The second front link end 102 may be pivotally coupled to a side member 86 in any suitable manner, such as with a pivot pin.

Referring to FIGS. 2 and 4, at least one side member 86 may be pivotally coupled to a front link 84 and may be pivotally coupled to a pivot link 94. In the configuration shown, two side members 86 are provided with each seat bottom portion. The side members 86 may extend along opposing lateral sides of a seat bottom portion and may extend in a fore/aft direction or between the front and back of the seat bottom 14. The side members 86 may be disposed substantially parallel to each other and may be spaced apart from each other. As is best shown with reference to FIGS. 5 and 6, each front link 84 may have a first side member end 110, a second side member end 112, and optionally a cover plate 114.

Figures 5, 6:
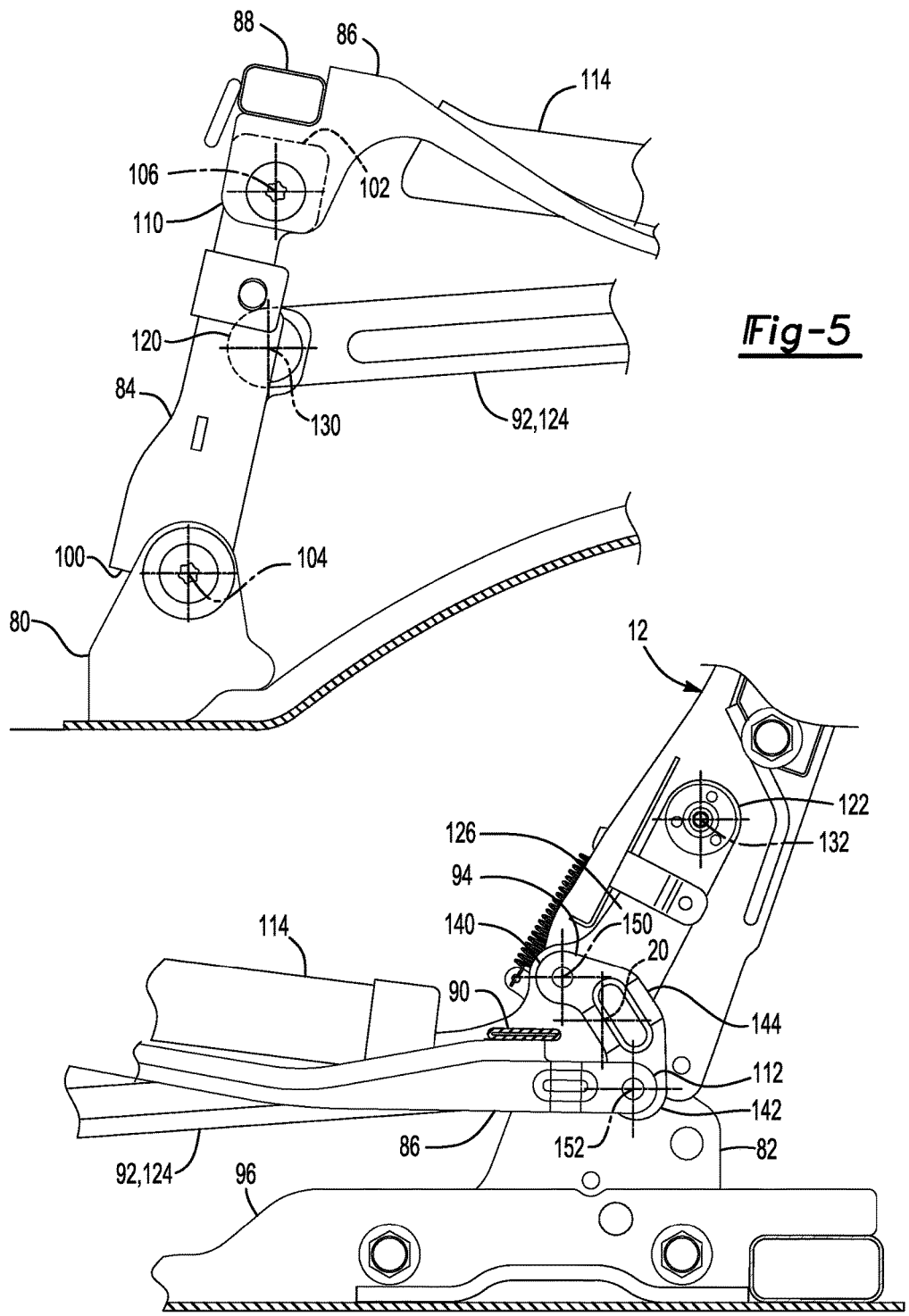
FIGS. 5 and 6 are magnified views of portions of the seat assembly shown in FIG. 4.

Referring to FIG. 5, the first side member end 110 may be disposed proximate the front of the seat bottom frame 52.

The first side member end 110 may be pivotally coupled to a second front link end 102 of a corresponding front link 84. For example, each side member 86 may receive a corresponding front link 84 and may be pivotable about the second front link axis 106 with respect to the front link 84. The second front link axis 106 may extend through the first side member end 110.

Referring to FIG. 6, the second side member end 112 may be disposed opposite the first side member end 110. The second side member end 112 may be pivotally connected to a pivot link 94 as will be discussed in more detail below.

Referring to FIGS. 2-6, a cover plate 114 may be fixedly disposed on each front link 84. The cover plate 114 may be disposed between the first side member end 110 and the second side member end 112. Each cover plate 114 may extend away from the center of the seat bottom portion and may extend over a corresponding drive link 92 such that the cover plate 114 is spaced apart from and does not engage the drive link 92. As such, the cover plate 114 may help support a cushion 42 of the seat bottom 14 and may separate the cushion 42 from the drive link 92 to prevent the drive link 92 from contacting the cushion 42 and exerting friction on the cushion 42 when the seat assembly 10 moves between the use position and the stow position.

Referring to FIGS. 2, 3, and 5, the front member 88 may be disposed proximate the front of the seat bottom frame 52. The front member 88 may extend laterally across the front of the seat bottom frame 52 and may be fixedly coupled to the side members 86 of a seat bottom portion. For example, the front member 88 may extend from the first side member end 110 of one side member 86 to the first side member end 110 of another side member 86. The front member 88 may be disposed above the second front link axis 106 when the seat assembly 10 is in the use position.

Referring to FIGS. 2 and 6, the rear member 90 may be disposed opposite the front member 88. For example, the rear member 90 may be disposed proximate the rear of the seat bottom frame 52. The rear member 90 may extend laterally across the rear of the seat bottom frame 52 and may be fixedly coupled to the side members 86 of a seat bottom portion. For example, the rear member 90 may be located near the second side member end 112 of the side members 86 and may extend from one side member 86 to another side member 86.

Referring to FIGS. 2-6, at least one drive link 92 may be pivotally coupled to a front link 84 and may be pivotally coupled to the seat back frame 50. In the configuration shown, two drive links 92 are provided with each seat bottom portion. The drive links 92 may extend along opposing lateral sides of a seat bottom portion and may extend in a fore/aft direction or between the front and back of the seat bottom 14. The drive links 92 may be disposed substantially parallel to each other and may be spaced apart from each other. Moreover, the drive links 92 may have the same configuration or similar configurations. Each drive link 92 may be laterally positioned inboard or toward the center of the seat bottom 14 with respect to a second mounting bracket 82 and may be laterally positioned between a second mounting bracket 82 and a pivot link 94. As is best shown with reference to FIGS. 5 and 6, each drive link 92 may have a first drive link end 120, a second drive link end 122, a first drive link portion 124, and a second drive link portion 126.

Referring to FIG. 5, the first drive link end 120 may be disposed proximate the front of the seat bottom frame 52. The first drive link end 120 may be pivotally coupled to a corresponding front link 84. For example, each drive link 92 may be mounted to a corresponding front link 84 and may be pivotable about a first drive link axis 130 with respect to the front link 84. The first drive link axis 130 may be disposed substantially parallel to the seat back pivot axis 20. The first drive link axis 130 may be disposed between the first front link end 100 and the second front link end 102 and between the first front link axis 104 and the second front link axis 106. The first drive link end 120 may be pivotally coupled to a front link 84 in any suitable manner, such as with a pivot pin.

Referring to FIG. 6, the second drive link end 122 may be disposed opposite the first drive link end 120. The second drive link end 122 may be pivotally connected to the seat back 12. For example, each drive link 92 may be pivotable about a second drive link axis 132 with respect to the seat back frame 50. The second drive link axis 132 may be disposed substantially parallel to the seat back pivot axis 20. The second drive link axis 132 may extend through the second front link end 102. The second drive link end 122 may be pivotally coupled to the seat back frame 50 in any suitable manner, such as with a pivot pin. In addition, the drive links 92 may be spaced apart from and may not engage the side members 86 between the first drive link end 120 and the second drive link end 122. For example, the side members 86 may not have a rod or pin that may extend from a side member 86 and may be received in a guide slot in a drive link as is disclosed in U.S. Patent Publication No. 2017/0001543, which is assigned to the assignee of the present invention.

Referring to FIGS. 4 and 5, the first drive link portion 124 may extend from the first drive link end 120 toward the seat back 12. The first drive link portion 124 may be disposed under a corresponding cover plate 114 and may extend a generally linear manner when viewed from the side of the seat assembly 10.

Referring to FIGS. 4 and 6, the second drive link portion 126 may extend from the second drive link end 122 to an end of the first drive link portion 124. The second drive link portion 126 may extend at an angle with respect to the first drive link portion 124. For example, the second drive link portion 126 may extend at an angle that extends upwardly away from the support member 22 and toward the seat back 12. The second drive link portion 126 may extend in a generally linear manner when viewed from the side of the seat assembly 10 and may have a length that is less than a length of the first drive link portion 124. As such, the drive link 92 may have a configuration that resembles a hockey stick.

Referring to FIGS. 2, 4 and 6, at least one pivot link 94 may be pivotally coupled to a drive link 92 and may be pivotally coupled to a side member 86. In the configuration shown, two pivot links 94 are provided with each seat bottom portion. The pivot links 94 may be laterally positioned between a drive link 92 and an adjacent side member 86. In at least one configuration, a pivot link 94 may have a generally L-shaped configuration when viewed from the side. As is best shown in FIG. 6, each pivot link 94 may have a first pivot link end 140, a second pivot link end 142, and a connecting portion 144.

The first pivot link end 140 may be disposed near the rear of the seat bottom frame 52. The first pivot link end 140 may be pivotally connected to a corresponding drive link 92. For example, each pivot link 94 may be mounted to a second drive link portion 126 of a corresponding drive link 92 and may be pivotable about a first pivot link axis 150 with respect to the drive link 92. The first pivot link axis 150 may be disposed substantially parallel to the seat back pivot axis 20. The first pivot link axis 150 may be disposed between the first pivot link end 140 and the second pivot link end 142. The first pivot link end 140 may be pivotally coupled to a drive link 92 in any suitable manner, such as with a pivot pin. The first pivot link axis 150 may be disposed further from the support member 22 than the seat back pivot axis 20 when the seat back 12 is in the use position and may be disposed closer to the support member 22 than the seat back pivot axis 20 when the seat back 12 is in the stow position as is best shown by comparing FIGS. 4 and 7.

Referring to FIG. 6, the second pivot link end 142 may be disposed opposite the first pivot link end 140. The second pivot link end 142 may be pivotally connected to a second side member end 112 of the side member 86. For example, each pivot link 94 may be pivotable about a second pivot link axis 152 with respect to the side member 86. The second pivot link axis 152 may be disposed substantially parallel to the seat back pivot axis 20. Moreover, second pivot link axis 152 may extend through the second side member end 112 and may be positioned such that the first pivot link axis 150 may be disposed above the second pivot link axis 152 in the use position and in the stow position. The first pivot link axis 150 may be disposed closer to the front link 84 than the second pivot link axis 152 when the seat back 12 is in the use position and may be disposed further from the front link 84 than the second pivot link axis 152 when the seat back 12 is in the stow position as is best shown by comparing FIGS. 4 and 7. In addition, the second pivot link axis 152 may be disposed further from the front link 84 than the seat back pivot axis 20 when the seat back 12 is in the use position and may be disposed closer to the front link 84 than the seat back pivot axis 20 when the seat back 12 is in the stow position. The second pivot link end 142 may be pivotally coupled to the side member 86 in any suitable manner, such as with a pivot pin.

Referring to FIG. 6, the connecting portion 144 may be disposed between the first pivot link end 140 and the second pivot link end 142. The connecting portion 144 may extend in a lateral direction between a drive link 92 and a side member 86. For example, the connecting portion 144 may extend inboard or toward the center of the seat bottom portion from the drive link 92 to the side member 86. As such, the pivot link 94 may be completely disposed between the drive link 92 and an adjacent side member 86 and may help separate the drive link 92 from the side member 86.

Referring to FIGS. 2 and 3, one or more latch mechanisms 54 may selectively permit movement of the seat assembly 10 from the use position to the stow position. In at least one configuration, a latch mechanism 54 may be disposed on a lateral side of the seat assembly 10 and may extend between the seat back 12 and the seat bottom 14. The latch mechanism 54 may move between a latched position and an unlatched position. The latch mechanism 54 may inhibit movement of the seat assembly 10 from the use position to the stow position when in the latched position. The latch mechanism 54 may be actuated to an unlatched position to permit movement of the seat assembly 10 from the use position to the stow position. The latch mechanism 54 may be actuated in any suitable manner, such as by a release lever or a motor.

Referring to FIGS. 4 and 7, movement of the seat assembly 10 between the use position and the stow position will now be described in more detail. Starting with the seat assembly 10 in the use position as shown in FIG. 4, the latch mechanism 54 may be actuated to the unlatched position to permit movement from the use position to the stow position shown in FIG. 7. Force may be applied by one or more biasing members, by an actuator such as a motor, by force that may be manually exerted on the seat assembly 10, or combinations thereof to push or pull the seat back 12 in a forward direction to fold the seat back 12 over the seat bottom 14. As is best shown in FIG. 4, the seat back pivot axis 20 may intersect the pivot link 94 between the first pivot link axis 150 and the second pivot link axis 152 when the seat back 12 is in the use position.

Forward movement of the seat back 12 may cause the seat back 12 to rotate about the seat back pivot axis 20. Force may be transmitted from the seat back 12 to the drive links 92, thereby moving the drive link 92, front links 84, and the pivot links 94 forward or to the left from the perspective shown. As the seat back 12 is moved forward, the drive links 92 may pivot about the second drive link axis 132 with respect to the seat back 12 and pivot about the first drive link axis 130 with respect to the front links 84. The front links 84 may pivot about the first front link axis 104 with respect to the first mounting brackets 80 such that the second front link end 102 moves forward or away from the second mounting bracket 82 and downward toward the support member 22. Movement of the front links 84 may pull the side members 86 forward and downward and cause the side members 86 to rotate about the second front link axis 106 with respect to the front links 84. Movement of the side members 86 forward and downward may also move the fixedly attached front member 88 and rear member 90 forward and downward and may cause the side members 86 to rotate about the second pivot link axis 152 with respect to the pivot links 94. The pivot links 94 may rotate about the first pivot link axis 150 with respect to the drive links 92. At such, the pivot links 94 may help the side members 86 to swing forward and move further away from the second mounting brackets 82 by a greater extent than in a configuration that lacks pivot links, thereby allowing the cushion 42 of the seat bottom 14 to move further forward. This in turn may allow the seat back 12 to fold further down or fold down to a flat support member to reduce the height of the seat assembly 10 in the stow position, which may increase vehicle cargo volume. Accordingly, the seat bottom frame 52 and the seat bottom 14 may move forward and downward toward the support member 22 and the seat back 12 may be folded forward over the top of the seat bottom 14 when the seat assembly 10 moves to the stow position. As is best shown in FIG. 7, the seat back pivot axis 20 may not intersect the pivot link 94 when the seat back 12 is in the stow position.

The seat assembly 10 may move from the stow position to the use position by unfolding the seat back 12 or actuating the seat back 12 away from the seat bottom 14. The seat back frame 50 and the components of the seat bottom frame 52 may rotate about their respective axes in the opposite direction to move from the stow position shown in FIG. 7 to the use position shown in FIG. 4. The latch mechanism 54 and/or one or more stops may stop pivoting of the seat assembly 10 when the seat assembly 10 reaches the use position. The latch mechanism 54 may then move from the unlatched position to the latched position to hold the seat assembly 10 in the use position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
 a seat bottom; and
 a seat back that is pivotally disposed on the seat bottom, wherein the seat bottom has a seat bottom frame that includes:
  a side member having a first side member end and a second side member end;
  a front link having a first front link end that is pivotally connected to a support member at the first front link end and pivotally connected to the first side member end;
  a drive link having a first drive link end that is pivotally connected to the front link and a second drive link end that is pivotally connected to the seat back; and
  a pivot link having a first pivot link end that is pivotally connected to the drive link and a second pivot link end that is directly pivotally connected to the second side member end, wherein the seat back is pivotable about a seat back pivot axis between a use position that is generally vertical and a stow position atop the seat bottom that is generally horizontal and wherein forward movement of the seat back from the use position to the stow position causes the seat back to rotate about the seat back pivot axis and move the drive link and the pivot link forward, causing the front link, the side member, and the pivot link to pivot such that the seat bottom moves forward and downward toward the support member.

2. The seat assembly of claim 1 wherein the drive link is spaced apart from and does not engage the side member.

3. The seat assembly of claim 1 wherein the drive link is not connected to the side member between the first side member end and the second side member end.

4. The seat assembly of claim 1 wherein the pivot link is positioned between the side member and the drive link.

5. The seat assembly of claim 1 wherein the pivot link has an L-shaped configuration.

6. The seat assembly of claim 1 wherein the seat bottom frame includes:
 a first mounting bracket that is fixedly mountable to the support member; and
 a second mounting bracket that is fixedly mountable to the support member, wherein the seat back is pivotable about the seat back pivot axis with respect to the second mounting bracket;
 wherein the front link is pivotable about a first front link axis with respect to the first mounting bracket;
 the side member is pivotable about a second front link axis with respect to the front link;
 the drive link is pivotable about a first drive link axis with respect to the front link and is pivotable about a second drive link axis with respect to the seat back; and
 the pivot link is pivotable about a first pivot link axis with respect to the drive link and is pivotable about a second pivot link axis with respect to the side member.

7. The seat assembly of claim 6 wherein the first pivot link axis is disposed above the second pivot link axis in the use position and the stow position.

8. The seat assembly of claim 6 wherein the first pivot link axis is disposed closer to the front link than the second pivot link axis when the seat back is in the use position.

9. The seat assembly of claim 8 wherein the first pivot link axis is disposed further from the front link than the second pivot link axis when the seat back is in the stow position.

10. The seat assembly of claim 6 wherein the first pivot link axis is disposed further from the support member than the seat back pivot axis when the seat back is in the use position and the first pivot link axis is disposed closer to the support member than the seat back pivot axis when the seat back is in the stow position.

11. The seat assembly of claim 10 wherein the drive link is positioned between the second mounting bracket and the pivot link.

12. The seat assembly of claim 11 wherein the pivot link is positioned between the drive link and the side member.

13. The seat assembly of claim 6 wherein the second pivot link axis is disposed further from the front link than the seat back pivot axis when the seat back is in the use position.

14. The seat assembly of claim 13 wherein the second pivot link axis is disposed closer to the front link than the seat back pivot axis when the seat back is in the stow position.

15. The seat assembly of claim 6 wherein the seat back pivot axis intersects the pivot link when the seat back is in the use position and the seat back pivot axis does not intersect the pivot link when the seat back is in the stow position.

16. The seat assembly of claim 6 wherein the seat back pivot axis intersects the pivot link between the first pivot link axis and the second pivot link axis when the seat back is in the use position.

17. The seat assembly of claim 6 wherein forward movement of the seat back from the use position to the stow position causes the seat back to rotate about the seat back pivot axis and move the drive link and the pivot link forward, causing the pivot link to pivot about the first pivot link axis and the front link to pivot about the first front link axis such that the seat bottom moves forward and downward toward the support member.

* * * * *